(12) United States Patent　(10) Patent No.: US 8,725,174 B2
Grossman et al.　(45) Date of Patent: May 13, 2014

(54) MOBILE DEVICE ALERT GENERATION SYSTEM AND METHOD

(75) Inventors: Joel Grossman, San Francisco, CA (US); Jacqueline Allison Bernstein, San Francisco, CA (US); Mitchell Scott Ozer, San Francisco, CA (US); Daniel Hodges, San Francisco, CA (US)

(73) Assignee: WaveMarket, Inc., Emeryville, CA (US)

( * ) Notice: Subject to any disclaimer, the term of this patent is extended or adjusted under 35 U.S.C. 154(b) by 157 days.

(21) Appl. No.: 13/087,250

(22) Filed: Apr. 14, 2011

(65) Prior Publication Data

US 2012/0100866 A1　Apr. 26, 2012

Related U.S. Application Data

(60) Provisional application No. 61/406,125, filed on Oct. 23, 2010.

(51) Int. Cl.
*H04W 24/00*　(2009.01)
*H04M 3/42*　(2006.01)
*H04M 1/725*　(2006.01)

(52) U.S. Cl.
USPC .................. 455/456.3; 455/414.1; 455/412.2

(58) Field of Classification Search
USPC .......... 455/456.1, 412.1, 412.2, 414.1, 414.2, 455/414.3
See application file for complete search history.

(56) References Cited

U.S. PATENT DOCUMENTS

| | | | |
|---|---|---|---|
| 4,788,711 A | 11/1988 | Nasco | |
| 5,223,844 A | 6/1993 | Mansell et al. | |
| 5,278,539 A | 1/1994 | Lauterbach et al. | |
| 5,535,431 A * | 7/1996 | Grube et al. | 455/411 |
| 5,604,787 A | 2/1997 | Kotzin et al. | |
| 5,610,821 A | 3/1997 | Gazis et al. | |
| 5,628,050 A | 5/1997 | McGraw et al. | |
| 5,724,243 A | 3/1998 | Westerlage et al. | |
| 5,732,383 A | 3/1998 | Foladare et al. | |
| 5,815,802 A | 9/1998 | Loechner, II | |
| 5,833,479 A | 11/1998 | Talbot | |
| 5,907,293 A | 5/1999 | Tognazzini | |
| 5,948,040 A | 9/1999 | Delorme et al. | |
| 5,959,577 A | 9/1999 | Fan et al. | |
| 5,959,945 A | 9/1999 | Kleiman | |

(Continued)

FOREIGN PATENT DOCUMENTS

| | | |
|---|---|---|
| EP | 0781067 | 6/1997 |
| EP | 1081974 | 3/2001 |

(Continued)

OTHER PUBLICATIONS

Office Action dated Nov. 13, 2012 for U.S. Appl. No. 12/857,888.

(Continued)

*Primary Examiner* — Christopher M Brandt (74) *Attorney, Agent, or Firm* — Dovas Law, P.C.

(57) ABSTRACT

A computer-implemented method for providing an alert regarding mobile device location is provided. The method includes obtaining location data corresponding to locations of a mobile device over a period of time. A location pattern is determined based on the location data. The current location of the mobile device is detected at a time based on the determined pattern, and an alert is provided regarding the current location of the mobile device. A system for providing alerts regarding mobile device location is also provided.

16 Claims, 7 Drawing Sheets

(56) References Cited

U.S. PATENT DOCUMENTS

| | | | |
|---|---|---|---|
| 6,031,455 A | 2/2000 | Grube et al. | |
| 6,052,598 A | 4/2000 | Agrawal et al. | |
| 6,091,956 A | 7/2000 | Hollenberg | |
| 6,115,611 A | 9/2000 | Kimoto et al. | |
| 6,134,454 A | 10/2000 | Foladare et al. | |
| 6,236,933 B1 | 5/2001 | Lang | |
| 6,240,294 B1 | 5/2001 | Hamilton et al. | |
| 6,243,039 B1 | 6/2001 | Elliot | |
| 6,256,577 B1 | 7/2001 | Graunke | |
| 6,278,375 B1 | 8/2001 | Hucker | |
| 6,351,221 B1 | 2/2002 | Phillips et al. | |
| 6,381,465 B1 | 4/2002 | Chern et al. | |
| 6,400,956 B1 | 6/2002 | Richton | |
| 6,437,696 B1 | 8/2002 | Lemelson et al. | |
| 6,501,947 B1 | 12/2002 | Hunzinger et al. | |
| 6,519,465 B2 | 2/2003 | Stilp et al. | |
| 6,587,835 B1 | 7/2003 | Treyz et al. | |
| 6,615,130 B2 | 9/2003 | Myr | |
| 6,631,267 B1 | 10/2003 | Clarkson et al. | |
| 6,647,257 B2 | 11/2003 | Owensby | |
| 6,647,269 B2 | 11/2003 | Hendrey et al. | |
| 6,701,234 B1 | 3/2004 | Vogelsang et al. | |
| 6,731,238 B2 | 5/2004 | Johnson | |
| 6,731,940 B1 | 5/2004 | Nagendran | |
| 6,745,021 B1 | 6/2004 | Stevens | |
| 6,772,213 B2 | 8/2004 | Glorikian | |
| 6,795,710 B1 | 9/2004 | Creemer | |
| 6,813,502 B2 | 11/2004 | Son et al. | |
| 6,816,720 B2 | 11/2004 | Hussain et al. | |
| 6,834,195 B2 | 12/2004 | Brandenberg et al. | |
| 6,873,850 B2 | 3/2005 | Dowling et al. | |
| 6,885,874 B2 | 4/2005 | Grube et al. | |
| 6,895,238 B2 | 5/2005 | Newell et al. | |
| 6,914,525 B2 | 7/2005 | Rao et al. | |
| 6,941,126 B1 | 9/2005 | Jordan, Jr. | |
| 6,952,645 B1 | 10/2005 | Jones | |
| 6,961,562 B2 | 11/2005 | Ross | |
| 6,985,696 B2 | 1/2006 | Bromham et al. | |
| 7,039,387 B2 | 5/2006 | Macolly et al. | |
| 7,054,612 B2 | 5/2006 | Patel | |
| 7,079,850 B2 | 7/2006 | Cameron | |
| 7,123,926 B2 | 10/2006 | Himmelstein | |
| 7,149,533 B2 | 12/2006 | Laird et al. | |
| 7,184,744 B1 | 2/2007 | Schnabel | |
| 7,194,249 B2 | 3/2007 | Phillips et al. | |
| 7,202,814 B2 | 4/2007 | Caspi et al. | |
| 7,248,961 B2 | 7/2007 | Park et al. | |
| 7,260,378 B2 | 8/2007 | Holland et al. | |
| 7,301,450 B2 | 11/2007 | Carrino | |
| 7,525,484 B2 | 4/2009 | Dupray et al. | |
| 7,593,740 B2 | 9/2009 | Crowley et al. | |
| 7,606,772 B2 | 10/2009 | Flinn et al. | |
| 7,643,834 B2 | 1/2010 | Ioppe et al. | |
| 7,764,946 B1 | 7/2010 | Sennett et al. | |
| 7,864,073 B2 | 1/2011 | Lee et al. | |
| 7,876,239 B2 | 1/2011 | Horstemeyer | |
| 7,881,864 B2 | 2/2011 | Smith | |
| 7,941,161 B2 | 5/2011 | Ioppe et al. | |
| 7,941,162 B2 | 5/2011 | Ioppe et al. | |
| 7,957,751 B2 | 6/2011 | Cone | |
| 7,974,637 B1 | 7/2011 | Taveniku | |
| 7,983,659 B2 * | 7/2011 | Shinya | 455/414.1 |
| 8,023,959 B2 | 9/2011 | Bhuta et al. | |
| 8,032,153 B2 | 10/2011 | Dupray et al. | |
| 8,073,460 B1 * | 12/2011 | Scofield et al. | 455/456.1 |
| 8,073,907 B2 | 12/2011 | Roumeliotis et al. | |
| 8,145,240 B2 | 3/2012 | Roumeliotis et al. | |
| 8,200,248 B2 | 6/2012 | Ioppe et al. | |
| 8,204,514 B2 | 6/2012 | Ioppe et al. | |
| 8,229,421 B2 | 7/2012 | Hotes et al. | |
| 8,244,236 B2 | 8/2012 | Roumeliotis et al. | |
| 8,315,905 B1 | 11/2012 | Adair | |
| 8,412,647 B2 | 4/2013 | Hotes et al. | |
| 8,447,810 B2 | 5/2013 | Roumeliotis et al. | |
| 2001/0022558 A1 | 9/2001 | Karr, Jr. et al. | |
| 2001/0029425 A1 | 10/2001 | Myr | |
| 2001/0044310 A1 | 11/2001 | Lincke | |
| 2002/0116266 A1 | 8/2002 | Marshall | |
| 2002/0193150 A1 | 12/2002 | Pritchard | |
| 2003/0008668 A1 * | 1/2003 | Perez-Breva et al. | 455/456 |
| 2003/0064788 A1 | 4/2003 | Walker et al. | |
| 2003/0216960 A1 | 11/2003 | Postrel | |
| 2004/0122734 A1 | 6/2004 | Schleicher et al. | |
| 2004/0147267 A1 | 7/2004 | Hill et al. | |
| 2004/0185822 A1 | 9/2004 | Tealdi et al. | |
| 2004/0186776 A1 | 9/2004 | Llach | |
| 2004/0214584 A1 | 10/2004 | Marinier | |
| 2004/0259573 A1 | 12/2004 | Cheng | |
| 2005/0079877 A1 * | 4/2005 | Ichimura | 455/456.1 |
| 2005/0195193 A1 | 9/2005 | Lehman | |
| 2005/0202830 A1 * | 9/2005 | Sudit | 455/456.1 |
| 2005/0282559 A1 | 12/2005 | Erskine et al. | |
| 2006/0009234 A1 | 1/2006 | Freer | |
| 2006/0058036 A1 * | 3/2006 | Watanabe et al. | 455/456.1 |
| 2006/0064346 A1 | 3/2006 | Steenstra et al. | |
| 2006/0079245 A1 | 4/2006 | Moed | |
| 2006/0089136 A1 | 4/2006 | Rajkotia | |
| 2006/0089878 A1 | 4/2006 | Roberts et al. | |
| 2006/0111089 A1 | 5/2006 | Winter et al. | |
| 2006/0135120 A1 | 6/2006 | Likourezos | |
| 2006/0200435 A1 | 9/2006 | Flinn et al. | |
| 2006/0223494 A1 | 10/2006 | Chmaytelli et al. | |
| 2006/0270421 A1 | 11/2006 | Phillips et al. | |
| 2007/0049290 A1 * | 3/2007 | Mullen | 455/456.1 |
| 2007/0072583 A1 | 3/2007 | Barbeau et al. | |
| 2007/0100595 A1 | 5/2007 | Earles | |
| 2007/0142068 A1 | 6/2007 | Matsuo | |
| 2007/0149214 A1 | 6/2007 | Walsh et al. | |
| 2007/0218900 A1 | 9/2007 | Abhyanker | |
| 2007/0270132 A1 | 11/2007 | Poosala | |
| 2007/0273558 A1 | 11/2007 | Smith et al. | |
| 2007/0282678 A1 | 12/2007 | Dendi et al. | |
| 2007/0293240 A1 | 12/2007 | Drennan | |
| 2008/0018453 A1 | 1/2008 | Adler | |
| 2008/0027634 A1 | 1/2008 | Obradovich et al. | |
| 2008/0070588 A1 | 3/2008 | Morin | |
| 2008/0071749 A1 | 3/2008 | Schloter | |
| 2008/0077489 A1 | 3/2008 | Gilley et al. | |
| 2008/0119207 A1 | 5/2008 | Harris | |
| 2008/0146250 A1 | 6/2008 | Aaron | |
| 2008/0153511 A1 | 6/2008 | Mock | |
| 2008/0153512 A1 * | 6/2008 | Kale et al. | 455/456.3 |
| 2008/0169920 A1 | 7/2008 | Spencer | |
| 2008/0183560 A1 | 7/2008 | Kaplan et al. | |
| 2008/0242373 A1 | 10/2008 | Lu et al. | |
| 2009/0156161 A1 | 6/2009 | Strahs | |
| 2010/0190513 A1 * | 7/2010 | Andreasson | 455/456.3 |
| 2010/0240924 A1 | 9/2010 | Roumeliotis et al. | |
| 2010/0241496 A1 | 9/2010 | Gupta et al. | |
| 2010/0241709 A1 | 9/2010 | Roumeliotis et al. | |
| 2010/0255856 A1 * | 10/2010 | Kansal et al. | 455/456.1 |
| 2010/0291907 A1 | 11/2010 | MacNaughtan et al. | |
| 2011/0034183 A1 | 2/2011 | Haag et al. | |
| 2011/0124399 A1 | 5/2011 | Dutilly et al. | |
| 2011/0143772 A1 * | 6/2011 | Sridhara et al. | 455/456.1 |
| 2011/0256881 A1 * | 10/2011 | Huang et al. | 455/456.1 |
| 2011/0302024 A1 | 12/2011 | Gunawardana et al. | |
| 2011/0320259 A1 | 12/2011 | Roumeliotis et al. | |
| 2012/0009904 A1 * | 1/2012 | Modi et al. | 455/413 |
| 2012/0040701 A1 | 2/2012 | Auterio et al. | |
| 2012/0077523 A1 | 3/2012 | Roumeliotis et al. | |
| 2012/0083285 A1 * | 4/2012 | Shatsky et al. | 455/456.1 |
| 2012/0135756 A1 | 5/2012 | Rosso et al. | |
| 2012/0202528 A1 | 8/2012 | Roumeliotis et al. | |
| 2012/0215617 A1 | 8/2012 | Shah et al. | |
| 2012/0253668 A1 | 10/2012 | Sheha et al. | |
| 2012/0315925 A1 | 12/2012 | Ioppe et al. | |

FOREIGN PATENT DOCUMENTS

| | | |
|---|---|---|
| JP | 11346380 | 12/1999 |
| WO | WO 0195592 | 12/2001 |
| WO | WO 0199082 | 12/2001 |

(56) References Cited

FOREIGN PATENT DOCUMENTS

| WO | WO 2004034721 | 4/2004 |
|---|---|---|
| WO | WO 2007040320 | 4/2007 |
| WO | WO 2007102816 | 9/2007 |

OTHER PUBLICATIONS

Office Action dated May 16, 2013 for U.S. Appl. No. 12/857,888.
Office Action dated Sep. 24, 2007 for U.S. Appl. No. 10/483,778.
Office Action dated Aug. 4, 2008 for U.S. Appl. No. 10/483,778.
Office Action dated Dec. 3, 2008 for U.S. Appl. No. 10/483,778.
Office Action dated Jun. 24, 2009 for U.S. Appl. No. 10/483,778.
Office Action dated Apr. 11, 2008 for U.S. Appl. No. 10/483,778.
Office Action dated Oct. 18, 2011 for U.S. Appl. No. 13/098,474.
Office Action dated Oct. 14, 2011 for U.S. Appl. No. 13/098,471.
Digital cellular telecommunications system (Phase 2+) (GSM);Universal Mobile Telecommunications System (UMTS); Location Services (LCS); Service description, Stage 1 (3GPP TS 22.871 version 4.3.0 Release 4); ETSI TS 122 071 V4.3.0 (Mar. 2003) ETSI TS 122 071 V4.3.0, XX, XX, Apr. 25, 2001, pp. 1-41, XP002222160.
Advisory Action dated Mar. 20, 2009 for U.S. Appl. No. 10/483,778.
International Search Report dated Apr. 17, 2003 for PCT/CA/0201080.
Streetadvisor.com, publication date unknown (access date Jun. 18, 2008).
Office Action dated dated Jul. 19, 2012 for U.S. Appl. No. 12/611,109.
Office Action dated Mar. 15, 2012 for U.S. Appl. No. 13/310,768.
Office Action dated Mar. 30, 2011 for U.S. Appl. No. 12/406,917.
Office Action dated Oct. 11, 2011 for U.S. Appl. No. 12/406,774.
Office Action dated Jun. 22, 2012 for U.S. Appl. No. 13/429,358.
International Search Report dated Nov. 17, 2008 for PCTAU2008001374.
European search report dated Mar. 9, 2012 for EP 08800009.6.

* cited by examiner

MOBILE DEVICE ALERT GENERATION SYSTEM AND METHOD

CROSS REFERENCE TO RELATED APPLICATION(S)

This application claims the benefit of U.S. provisional application No. 61/406,125, filed Oct. 23, 2010, which is incorporated by reference as if fully set forth.

BACKGROUND

Mobile communication devices such as cellular telephones, smart phones and the like are frequently enabled to receive signals from Global Positioning System (GPS) satellites for estimating device location coordinates. Also, many mobile communication devices have the ability to perform network scans to determine radio signal information, including identifiers associated with nearby cellular base transceiver stations, and radio access points such as WiFi™ and Bluetooth™ access points. Further, mobile communication devices are frequently enabled to perform signal strength estimates and other signal measurements of incoming signals. Cellular base transceiver stations and radio access points are primarily used for providing voice and data service to a mobile device, but due to their relative permanence can also be used for determining device location.

A number of techniques exist to translate terrestrial signal information into location, including cell triangulation and trilateration techniques, such as Time Difference of Arrival ("TDOA"), Enhanced Observed Time Difference ("EOTD"), Advanced Forward Link Trilateration ("AFLT") and Enhanced Cell Identification ("E-CID"). Such methods are considered terrestrial counterparts to the GPS satellite-based system which uses a form of triangulation based on satellite positioning. A mobile device may be configured for determining its own location, or in some cases, a remote system in communication with a mobile device via a network can be configured to determine a mobile device's location using translation techniques such as those described above.

It would be desirable to leverage known location determining processes to provide alerts to users and applications regarding the location of particular mobile communication devices. It would be further desirable that such functionality be provided with a high level of automation to enhance user experience.

SUMMARY

According to an embodiment of the invention, a computer-implemented method for providing an alert regarding mobile device location is provided. The method includes obtaining location data corresponding to locations of a mobile device over a period of time. A location pattern is determined based on the location data. The current location of the mobile device is detected at a time based on the determined pattern, and an alert is provided regarding the current location of the mobile device.

According to another embodiment of the invention, a computer-implemented method for providing an alert regarding mobile device location is provided. The method includes obtaining location data corresponding to locations of a plurality of mobile device users over a period of time. A location pattern of the plurality of mobile device users is determined based on the location data. A current location of a particular mobile device user is detected, and an alert is provided based on the current location of the particular mobile device user and the determined location pattern.

According to another embodiment of the invention, a computer-implemented method for providing an alert regarding mobile device location is provided. The method includes detecting requests for location data corresponding to the location of one or more mobile devices over a period of time. A request pattern is determined based on the requests for location data. A current location of the one or more mobile devices is detected at a time based on the determined request pattern. An alert is provided rendering accessible the current location at the time based on the determined request pattern.

According to another embodiment of the invention, a computer-implemented method for providing an alert regarding mobile device location is provided. The method includes detecting requests from a plurality of users for location data corresponding to the location of a plurality of mobile devices. A request pattern of the plurality of users is determined based on the requests for location data. A current location of a particular mobile device is detected at a time based on the determined request pattern, and an alert is provided rendering accessible the current location of the particular mobile device.

According to another embodiment of the invention, a computer-implemented method for providing an alert regarding mobile device location is provided. The method includes receiving identifying information of a user corresponding to one or more environmental conditions. The user is detected at a particular location. Mapping data is received defining positioning of the one or more environmental conditions, and an alert is provided to the user regarding the environmental condition in response to the one or more environmental conditions corresponding to the detected particular location.

According to another embodiment of the invention, a system for providing an alert regarding mobile device location including one or more computing devices with one or more memories comprising instructions operable to enable the one or more computing devices to perform a procedure. The procedure includes obtaining location data corresponding to locations of a mobile device over a period of time and determining a location pattern based on the location data. A current location of the mobile device is detected at a time based on the determined pattern, and an alert is provided regarding the current location of the mobile device.

Elements described with respect to a particular invention embodiment in the above summary or in the below detailed description can be used in the performance of a method or implementation of a system in one or more other invention embodiments described herein.

BRIEF DESCRIPTION OF THE DRAWING(S)

The foregoing summary as well as the following detailed description will be readily understood in conjunction with the appended drawings which illustrate embodiments of the invention. In the drawings.

DETAILED DESCRIPTION OF THE PREFERRED EMBODIMENT(S)

Figure 1:
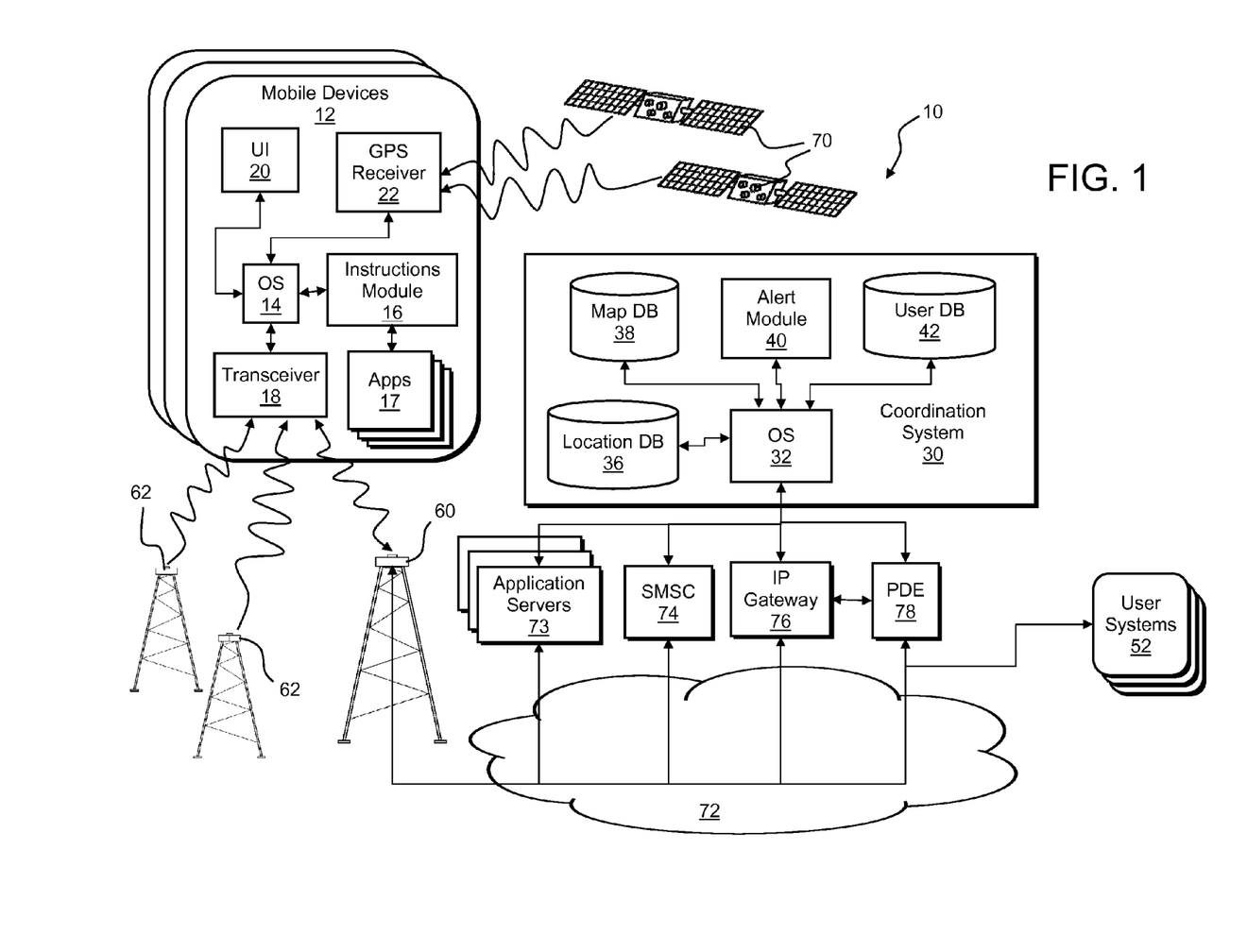
FIG. 1 is a schematic illustration of an exemplary operating environment in which a coordination system is operable.

Referring to FIG. 1, a schematic illustration is shown of an exemplary operating environment 10 in which mobile device communication systems, in the form of mobile devices 12 and a coordination system 30, can be used. The mobile devices 12 and coordination system 30 each include one or more computing devices and one or more memory devices, which computing devices and memory devices can be integrally constructed or connected in any suitable manner. It is to be understood that a system or server as described herein comprises a computer system, as is known in the art.

Each mobile device 12 preferably provides a platform which enables an operating system 14 and a module of instructions 16 preferably residing in a memory of the mobile device 12. The mobile device 12, preferably a wireless transmitting and receiving device with cellular telephone functionality, includes a transceiver 18 for communication with cellular base transceiver stations 60, 62 ("base stations") and a user interface 20, preferably including a display and one or more audio speakers. The transceiver 18 can be configured to communicate with any suitable wireless stations or devices. The mobile device 12 can alternatively include a plurality of transceivers for communication with a plurality of wireless stations or devices of differing protocols. A GPS receiver 22 is preferably provided to receive signals from GPS satellites 70 for determining a location of the mobile device 12.

The coordination system 30 includes a processor or processors and memory or memories which enable operation of an operating system 32, an alert module 40, and databases 36, 38, 42. Preferably, collected mobile device location data is stored in a location database 36, map data corresponding to roads, addresses, building dimensions, and other definable geographic data are stored in a map database 38, and user account information for particular users is stored in a user account database 42. The coordination system 30 is configured to collect data indicative of mobile device location of the mobile devices 12 via a telecommunication network 72, which can include the Internet and other networks, and to associate the mobile devices 12 with particular users associated with accounts in the user account database 42. The location data is preferably received in the form of tuples. Each tuple preferably includes one or more location coordinates and one or more time stamps respectively associated with the one or more location coordinates. Each tuple also preferably includes an identification ("ID") relating the tuple to a particular mobile device and a precision indication indicating the precision and/or accuracy of the one or more location coordinates.

The tuples or other suitable mobile device location data can be received by the coordination system 30 in the form of one or more short message service ("SMS") messages received from the mobile devices 12 via a short message service center ("SMSC") 74, which can be integrated with the telecommunication network 72 or otherwise provided. Alternatively, location data can be sent by the mobile devices 12 using internet protocol ("TCP/IP") and received by the coordination system 30 via an internet protocol ("IP") gateway 76, which can be integrated with the telecommunication network 72 or otherwise provided. The coordination system 30 can alternatively query a remote position determining entity ("PDE") 78, a Gateway Mobile Location Center ("GMLC"), or other system for disseminating location data associated with mobile devices, which PDE 78, GMLC or other system can be provided as a service by a telecommunication carrier or other party, and which system can deliver data to the coordination system 30 via internet protocol through the IP gateway 76 or via other suitable protocol. The coordination system 30 can alternatively receive mobile device location data in any suitable manner.

One or more external application servers 73 can communicate with the coordination system 30 or a mobile device 12 and execute applications which use location data provided by the mobile devices 12 or the coordination system 30 to provide content or services to a user of a particular mobile device 12 or other users requiring data regarding a particular mobile device 12. Similarly, local applications 17 can use such location data to provide content or services to a user of a particular mobile device 12 or other users.

Figure 2:
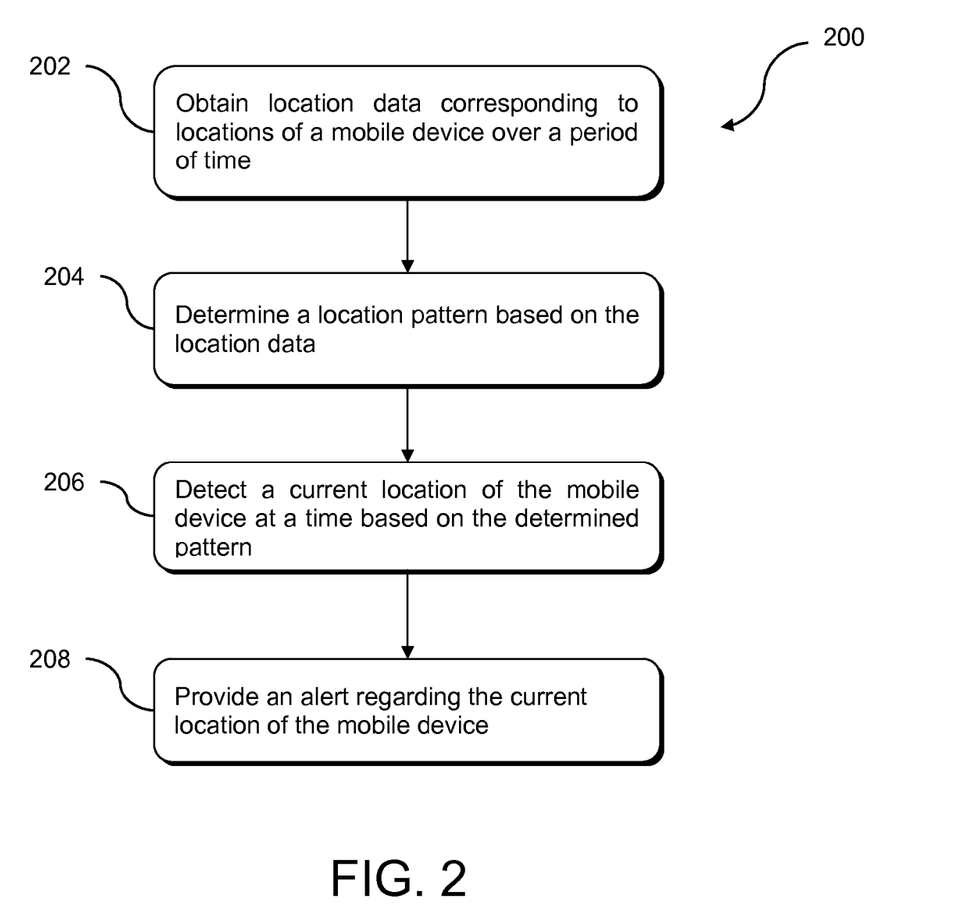
FIGS. 2-6 are flow charts showing computer-implemented methods for providing alerts regarding mobile device location.

Referring to FIG. 2, a method 200 for providing an alert regarding mobile device location is shown. The method 200 is described with reference to components shown in the operating environment 10 of FIG. 1, wherein the coordination system 30 is preferably configured to perform the method 200 and includes memory for storing instructions for performing the method 200. The method 200 can alternatively be performed via other suitable systems or devices. For example, the mobile device 12 can be configured to execute an application for performing the method 200 via the instructions module 16.

The method 200 includes obtaining location data corresponding to locations of a mobile device such as the mobile device 12 over a period of time (step 202) and determining a location pattern based on the location data (step 204). A current location of the mobile device 12 is detected at a time based on the determined pattern (step 206), and an alert is provided regarding the current location of the mobile device (step 208). Location data is obtained, for example, by the coordination system 30 and stored in the location database 36, and the location pattern is determined, for example, by the alert module 40 and stored in the location database 36. The current location is detected, for example, by the coordination system 30, responsive to the pattern determined by the alert module 40, via data received via a mobile device's GPS receiver 22, a remote position determining entity ("PDE") 78, a Gateway Mobile Location Center ("GMLC"), or other system for disseminating location data. The location alert is provided, for example, by the alert module 40 to a user via a user system 52 through the network 72.

The mobile device 12 preferably corresponds to a subject user such as a child, a pet, or any person or animal which under certain circumstance may require monitoring. The subject user possesses the mobile device 12 or the mobile device 12 is attached to the subject user to permit the subject user's location to be monitored by a supervising user via a user system 52, which can include any suitable network-connectable computing device. The supervising user preferably includes a parent, guardian or other person with supervisory or oversight responsibility for a particular subject user. In the case that the subject user is a pet, the supervising user can be a pet owner. The alert is preferably scheduled and provided to the supervising user as a data transmission. A user can be both a subject user and a supervising user, for example in the case of two spouses with mutual oversight responsibilities for each other.

The alert can alternatively be provided to a particular application, such as a social networking application. For example, the instruction module 16 of the mobile device 12 or the coordination system 30 executing the method 200 can provide the alert to a social networking application executed on a remote application server 73 via the network 72, which social networking application is accessible by a user system 52 to permit access by a supervising user to information contained in the alert. In another example, the instruction module 16 of the mobile device 12 executing the method 200 can provide the alert to a locally executed application 17 configured to transmit the alert via suitable protocol to the user system 52.

Prior to scheduling or transmitting alerts, a suggestion can be provided, for example by the coordination system 30 or an application executed on the mobile device 12. The suggestion can be provided to the supervising user via a user system 52 in the form of a query as to whether the supervising user desires to receive an alert regarding the current position of the subject user at a particular time. A suggestion can further be provided to the subject user for example via mobile device 12, in the form of a query as to whether the subject user desires to permit the supervising user to receive an alert regarding the current position of the subject user. The coordination system 30, the mobile device 12 or other suitable system can provide the alert in response to receiving acceptance of the suggestion from the subject user and/or the supervising user.

Figure 7:
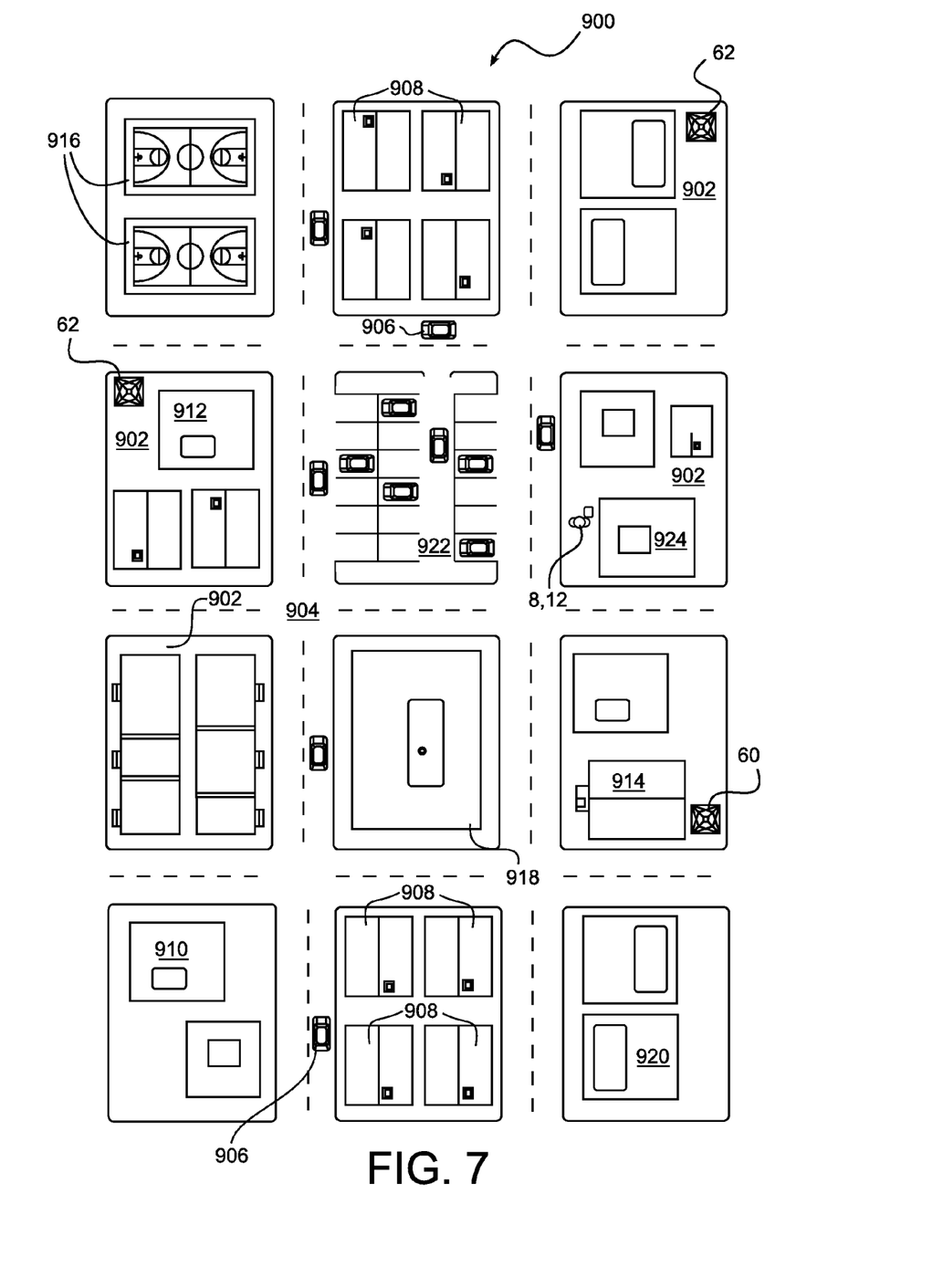
FIG. 7 is a plan view of an example city streetscape for illustrating methods according to invention embodiments.

For purposes of illustration of methods described herein, a plan view of an example city streetscape 900 is shown in FIG. 7. The streetscape 900 includes city blocks 902 separated by streets 904 permitting travel of vehicles 906. Various building structures are provided on the city blocks 902 including physical locations corresponding to homes 908, an office building 910, a retail store 912, a fitness club 914, playing courts 916, a supermarket 918, a restaurant 920, a parking lot 922, and a library 924. A user 8, carrying a mobile device 12, walks or drives a vehicle 906 within the streetscape 900.

The location pattern can be determined by determining the mobile device 12 is at a particular location during a particular time period of a day for a predetermined number of days. The alert can be provided based on the determined particular time period of the day, and preferably, the alert is provided substantially during such particular time period of day or a predetermined length of time thereafter. In an example pursuant to the method 200, a subject user is detected via a location enabled mobile device to be present at a particular location (e.g. the fitness club 914) from about 7:00 pm to about 9:00pm each Monday for 3 consecutive Mondays. In response to this detected behavior, the subject user's position is detected at various times between 7:00 pm and 9:00pm each Monday thereafter. If the subject user is not present at the fitness club 914 between 7:00pm and 9:00pm on a Monday, an alert reporting the subject user's current location to a supervising user is transmitted at about 8:00pm or one or more other times between 7:00pm and 9:00pm. Alternatively, the alert including the current location can be transmitted between about 7:00pm and 9:00pm each Monday regardless of whether if the subject user is present at the fitness club 914. In such manner a supervising user such as the subject user's spouse can learn whether or not the subject user has arrived at the fitness club 914 as expected.

The location pattern can alternatively be determined by determining the mobile device 12 leaves a particular location during a particular time period of a day for a predetermined number of days. The alert can be provided based on the determined particular time period of the day, and preferably the alert is provided substantially during such particular time period of the day or a predetermined length of time thereafter. In an example pursuant to the method 200, a subject user is detected via a location enabled mobile device to leave a first location corresponding to the user's place of work (e.g. office building 910) between 6:00pm and 7:00pm for 5 consecutive workdays, Monday through Friday. In response to this detected behavior, an alert reporting the subject user's location to a supervising user is transmitted to a supervising user one or more times at or about 7:00pm or soon thereafter each workday, Monday through Friday. In such manner, a supervising user such as the subject user's spouse can learn whether the subject user is still at work at the office building 910 at 7:00pm on a given day.

Figure 3:
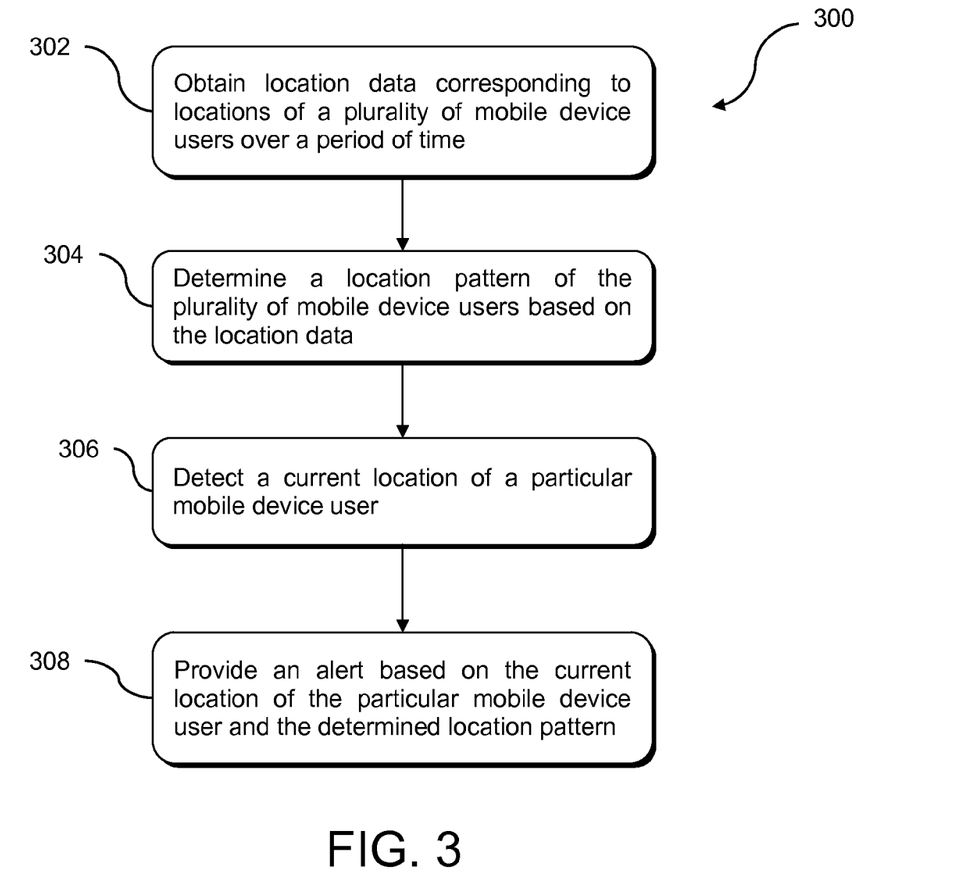

Referring to FIG. 3, a method 300 for providing an alert regarding mobile device location is shown. The method 300 is described with reference to components shown in the operating environment 10 of FIG. 1, wherein the coordination system 30 is preferably configured to perform the method 300 and includes memory for storing instructions for performing the method 300. The method 300 can alternatively be performed via other suitable systems or devices. For example, a mobile device 12 can be configured to execute an application for performing the method 300. The method 300 includes obtaining location data corresponding to locations of a plurality of mobile device users over a period of time via the users' mobile devices (step 302) and determining a location pattern of the plurality of mobile device users based on the location data (step 304). A current location of a particular mobile device user is detected via the user's mobile device (step 306), and an alert is provided based on the current location of the particular mobile device user and the determined location pattern (step 308). The method 300 enables patterns in similar or dissimilar users' location behaviors to be used to create pertinent alerts for a particular user. To determine similarity between users, identifying information for the mobile device users is preferably obtained.

Location data is obtained, for example, by the coordination system 30 and stored in the location database 36, and the location pattern is determined, for example, by the alert module 40 and stored in the location database 36. The current location is detected, for example, by the coordination system 30, responsive to the pattern determined by the alert module 40, via data received via a mobile device's GPS receiver 22, a remote position determining entity ("PDE") 78, a Gateway Mobile Location Center ("GMLC"), or other system for disseminating location data. The location alert is provided, for example, by the alert module 40 to a user via a user system 52 through the network 72.

In performing the method 300, identifying information corresponding to the plurality of mobile device users and the particular mobile device user is preferably obtained. The identifying information of each mobile device user preferably includes a plurality of user identifying criteria including one or more of a user address, city of residence, state of residence, age, gender, income level, education level, music preference, and occupation. Alternatively, the identifying information can include any suitable user identifying criteria. The identifying information of the plurality of mobile device users is compared with the identifying information of the particular mobile device user. The location pattern of the plurality of mobile device users is determined in response to the identifying information of the plurality of mobile device users corresponding to, or alternatively not corresponding to, the identifying information of the particular user. The identifying information of the mobile device users corresponds when at least one element of the identifying information matches. For example, location data from a plurality of users having an income level approximately equal to the income level of the particular user is used in determining the location pattern used to trigger an alert based on a current location of the particular user's mobile device. In another example, location data from a plurality of users having music preferences different from the music preferences of a particular user is used in determining the location pattern which is used to trigger an alert based on a current location of the particular user's mobile device.

The identifying information can be manually entered or uploaded to the coordination system 30 at any suitable time by a particular user via a mobile device 12, user system 52 or other system to create a profile for a particular mobile device user which can be stored in the user account database 42. Identifying information is preferably provided to the coordination system 30 via a web or WAP interface. In the case that the mobile device user is a child or otherwise under the care of a supervising user, the supervising user preferably provides the identifying information.

Alternatively, identifying information can be automatically gathered via connections to one or more other systems, such as an application server 73 via the network 72. The application server 73 can include, for example, a social networking application server hosting a social networking application enabling an online social network. The coordination system 30 is preferably configured to access and interface with an online social network supported by the social networking application to obtain a mobile device user's identifying information.

In performing the method 300, the location pattern can be determined by determining the plurality of users are at a particular location during a particular time period of a day for a predetermined number of days. The alert is thereafter provided in response to the current location of the particular mobile device being at the particular location during the particular time period of the day. Alternatively, the alert is provided in response to the current location of the particular mobile device being a predetermined distance from the particular location during the particular time period of the day. The alert can be provided to the particular user whose location is being detected or another user such as a supervising user (e.g. parent, spouse) desiring location information regarding the particular user (e.g. child, spouse). The alert can alternatively be provided to a local or remote application for example in one of the manners described above. The alert can include the location of the particular user, for example in the case where the alert is transmitted to a supervising user. Alternatively, the alert can include a notification of a particular location, preferably nearby the current location of the particular user, in the form of a suggestion that the particular user travel to or stay at the particular location, for example in the case where a particular user wants to be directed to a location frequented by users with like identifying information.

Prior to scheduling or transmitting alerts, a suggestion can be provided to the particular user, or alternatively another user, in the form of a query as to whether the user desires to receive an alert regarding the current position of the particular user. An acceptance of the suggestion indicating a desire to receive the alert can be obtained from the particular user, or alternatively the other user (e.g. a supervising user). The alert can thereafter be provided to the particular user or other user in response to receiving the acceptance of the suggestion.

In an example pursuant to the method 300, a plurality of users determined to be schoolmates of a particular user (e.g. Billy) are detected to go to a particular library each Friday afternoon between 3:00pm and 5:00pm over a period of weeks. Based on Billy's schoolmates' location pattern including Friday afternoon visits to the library, an alert is scheduled to fire when Billy arrives at the particular library 924. When Billy arrives at the library 924 between 3:00pm and 5:00pm, the alert is transmitted to Billy's mother notifying her that Billy is at the library. Alternatively, Billy's mother can be notified if Billy is not present at the library between 3:00pm and 5:00pm.

In another example pursuant to the method 300, information including an event schedule with event type listings for a particular location (e.g. Bloom's Saloon 920) is obtained. A particular user (e.g. Kelly) is determined to frequently go to the particular location (e.g. Bloom's Saloon 920) when a particular type of event is occurring (e.g. bluegrass music is playing), but not when another type of event is occurring (e.g. heavy metal music is playing). One night, a group of users are determined to be in attendance at Bloom's Saloon 920 who have been determined to have previously attended Bloom's Saloon 920 on nights when heavy metal music is playing, but not when bluegrass music is playing. The event preferences (e.g. music preferences) of Kelly and the group of users are compared. An alert is transmitted to Kelly that Kelly may not be interested in attending Bloom's Saloon 920 in view of the differing musical tastes of the group of users, and preferably in response to Kelly's current location being at or within a predetermined distance from Bloom's Saloon 920. An alert is alternatively transmitted to Kelly informing Kelly that she may or may not be interested in attending other nearby venues in view of the like or differing musical tastes of groups of users present at such other venues. Accordingly, an alert can be provided as a recommendation or suggestion that a particular mobile device user be present (or not be present) at a particular location corresponding to or a predetermined distance from the particular user's current location in response to an event preference of the particular mobile device user substantially matching (or not matching) an event preference of a plurality of other mobile device users. In this example, user identifying information in the form of the event preferences is therefore derived from determined locations of the users and information regarding events occurring at such locations.

Figure 4:
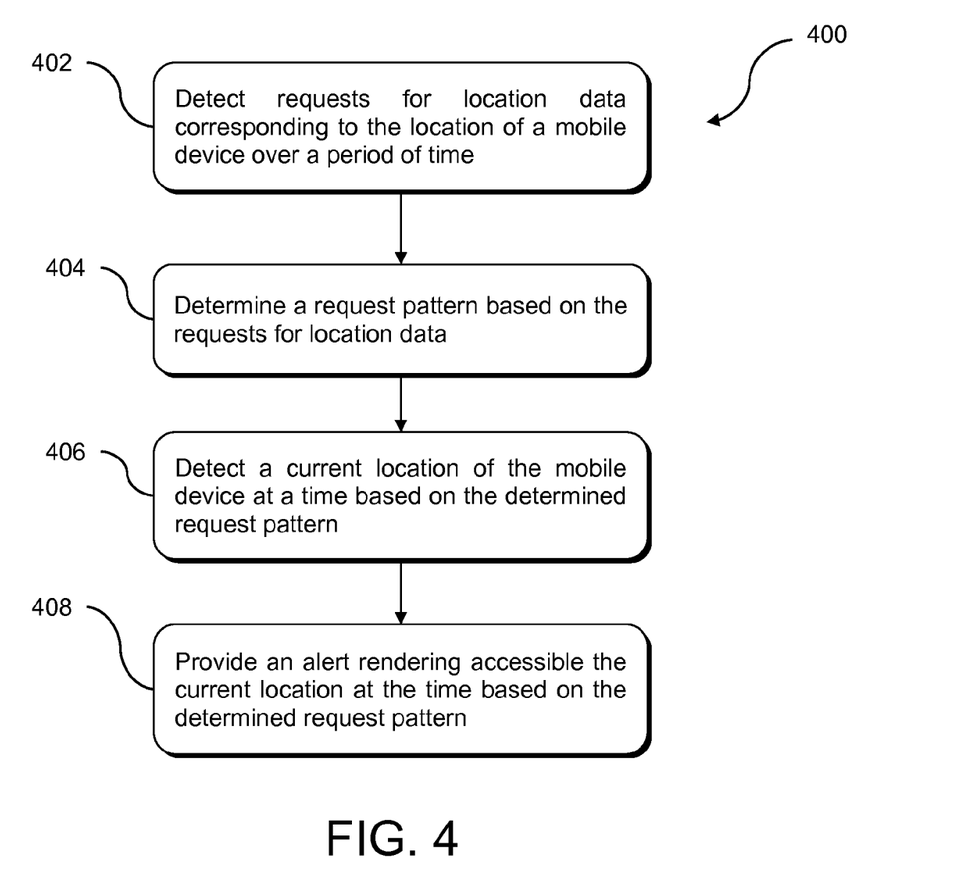

Referring to FIG. 4, a method 400 for providing an alert regarding mobile device location is shown. The method 400 is described with reference to components shown in the operating environment 10 of FIG. 1, wherein the coordination system 30 is preferably configured to perform the method 400 and includes memory for storing instructions for performing the method 400. The method 400 can alternatively be performed via other suitable systems or devices. For example, a mobile device 12 can be configured to execute an application for performing the method 400. The method 400 includes detecting requests for location data corresponding to the location of one or more mobile devices over a period of time (step 402) and determining a request pattern based on the requests for location data (step 404). A current location of the one or more mobile devices is detected at a time based on the determined request pattern (step 406), and an alert is provided rendering accessible the current location at the time based on the determined request pattern (step 408).

Requests for location data are detected, for example, by the coordination system 30 and stored in the user database 42, and the request pattern is determined, for example, by the alert module 40 and stored in the user database 42. The current location is detected, for example, by the coordination system 30, responsive to the pattern determined by the alert module 40, via data received via a mobile device's GPS receiver 22, a remote position determining entity ("PDE") 78, a Gateway Mobile Location Center ("GMLC"), or other system for disseminating location data. The alert is provided, for example, by the alert module 40, rendering accessible the current location to a user or application via the network 72.

The one or more mobile devices preferably correspond to at least a first user. Preferably the detected requests originate from a second user, such as a supervising user, and the alert renders the current location of the first user accessible to the second user. The request pattern is preferably determined by detecting a request originating from the second user occurring during a particular time period of a day for a predetermined number of days, and the alert is preferably provided on a later day during the particular time period of the day. The request pattern can alternatively be determined by detecting a request originating from the second user positioned at a particular location a predetermined number of times, and providing the alert to the second user in response to later detecting the second user at the particular location. The alert can alternatively be provided to a local or remote application for example in one of the manners described above.

In an example pursuant to the method 400, a request from a user (e.g. Monica) for her dog's location is detected each day, wherein a location aware mobile device is attached to the dog. Monica's request is detected as occurring each day upon Monica's arrival at her place of work (e.g. office building 910). Thereafter, an alert is transmitted to Monica every workday upon detecting Monica's mobile device at Monica's place of work at the office building 910. For example, the coordination system 30 can be configured to schedule an alert via the alert module 40 to be transmitted to Monica's mobile device 12 immediately upon detecting the mobile device 12 at the office building 910.

Figure 5:
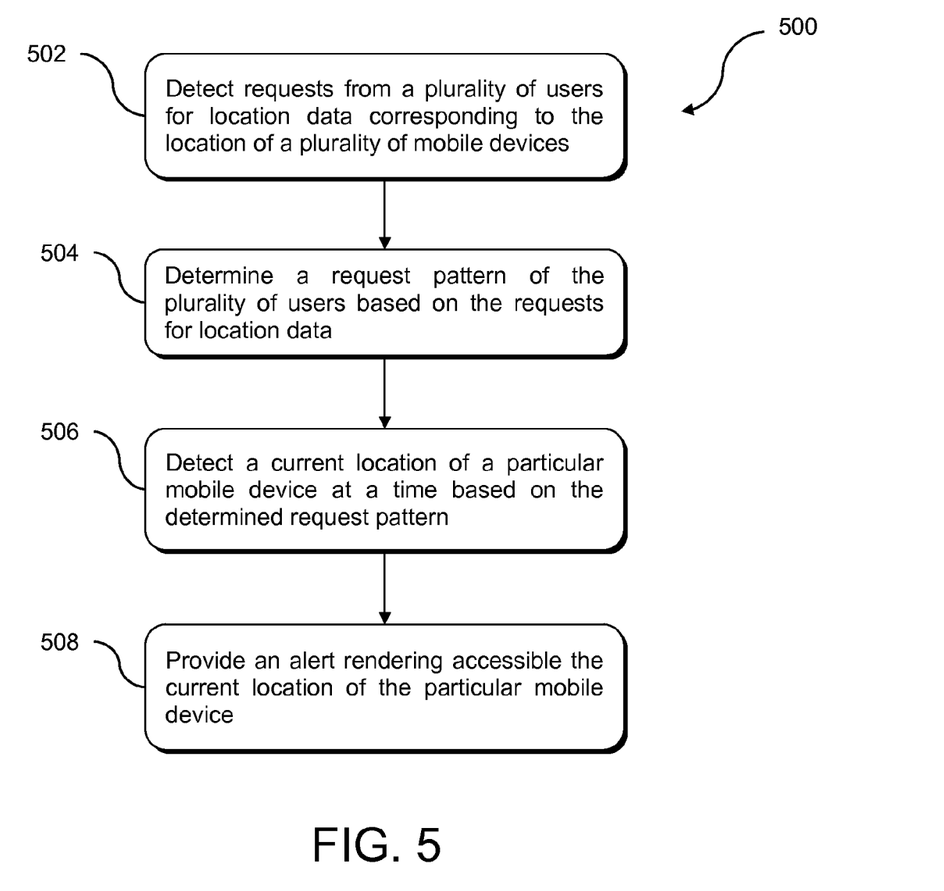

Referring to FIG. 5, a method 500 for providing an alert regarding mobile device location is shown. The method 500 is described with reference to components shown in the operating environment 10 of FIG. 1, wherein the coordination system 30 is preferably configured to perform the method 500 and includes memory for storing instructions for performing the method 500. The method 500 can alternatively be performed via other suitable systems or devices. For example, a mobile device 12 can be configured to execute an application for performing the method 500. The method 500 includes detecting requests from a plurality of users for location data corresponding to the location of a plurality of mobile devices (step 502) and determining a request pattern of the plurality of users based on the requests for location data (step 504). A current location of a particular mobile device is detected at a time based on the determined request pattern (step 506), and an alert is provided rendering accessible the current location of the particular mobile device (step 508).

Requests for location data are detected, for example, by the coordination system 30 and stored in the user database 42, and the request pattern is determined, for example, by the alert module 40 and stored in the user database 42. The current location is detected, for example, by the coordination system 30, responsive to the pattern determined by the alert module 40, via data received via a mobile device's GPS receiver 22, a remote position determining entity ("PDE") 78, a Gateway Mobile Location Center ("GMLC"), or other system for disseminating location data. The alert is provided, for example, by the alert module 40, rendering accessible the current location to a user or application via the network 72.

Identifying information corresponding to the plurality users and a particular user is preferably obtained. Identifying information of the plurality of users is compared with the identifying information of the particular user, for example via the alert module 40. The request pattern of the plurality of users is determined in response to the identifying information of the plurality of users corresponding to the identifying information of the particular user, whereby request data from users having identifying information which matches in a predetermined manner the identifying information of the particular user is used to define the request pattern used to determine the timing of the alert. The particular user is provided with the alert rendering accessible the current location of the particular mobile device. The alert can alternatively be provided to a local or remote application, for example in one of the manners described above, which application is preferably accessible by the particular user. For example, the particular user can correspond to a supervising user such as a parent, the particular mobile device can be carried by a supervised subject user such as a child of the parent, the other plurality of users can correspond for example to other supervising users such as other parents, and the plurality of mobile devices can correspond to other supervised users such as children of the other parents.

Prior to scheduling or transmitting alerts, a suggestion can be provided to the particular user in the form of a query as to whether the user desires to receive an alert regarding the current position of a particular mobile device. An acceptance of the suggestion indicating a desire to receive the alert can be obtained from the particular user. The alert can thereafter be provided to the particular user in response to receiving such acceptance.

In an example pursuant to the method 500, a particular user Margaret has a 13 year old child. A plurality of other users also have 13 year old children. The other users schedule an alert to automatically check locations of their respective children at about 10:00pm on all school nights. The scheduling of the alert can be performed for example by a request to the coordination system 30. In response to the alert scheduled by the other users, a suggestion is provided to Margaret to schedule an alert to occur at about 10:00pm on school nights including a current location of her child. The suggestion and alert can be provided in a transmission for example by the coordination system 30 via the alert module 40 to a device or system operated by Margaret.

Figure 6:
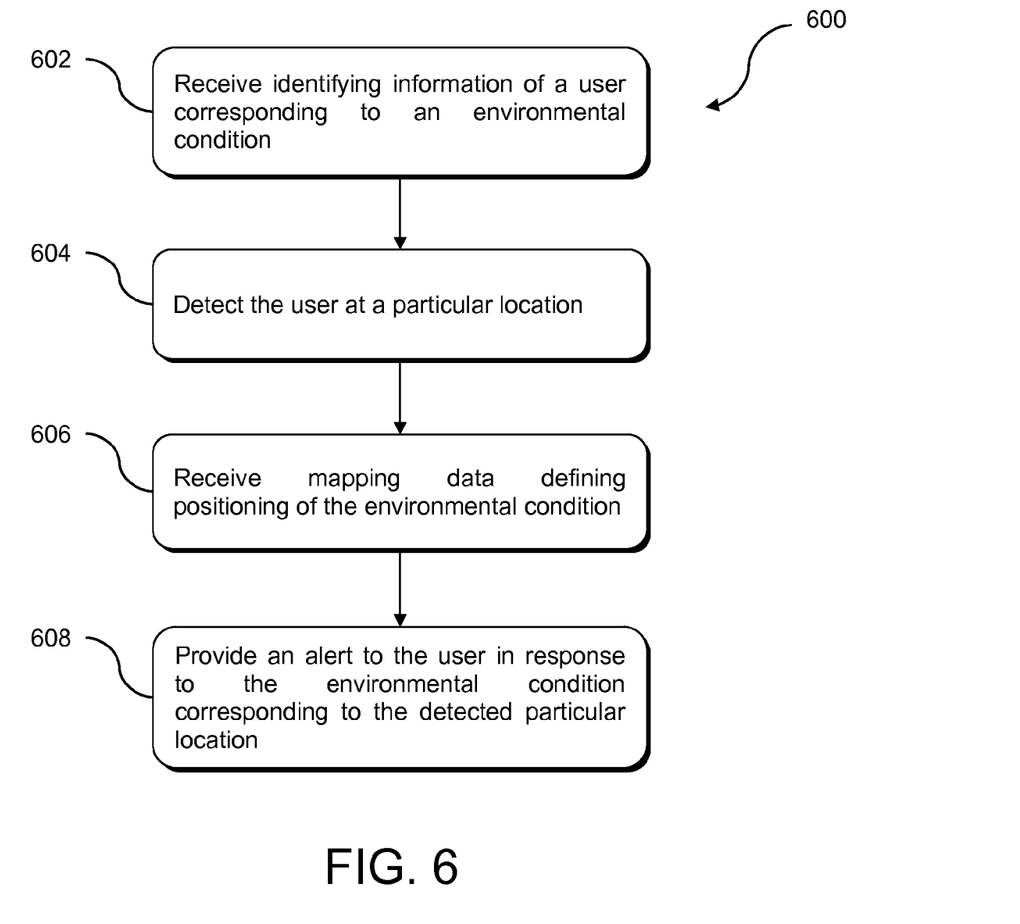

Referring to FIG. 6, a method 600 for providing an alert regarding mobile device location is shown. The method 600 is described with reference to components shown in the operating environment 10 of FIG. 1, wherein the coordination system 30 is preferably configured to perform the method 600 and includes memory for storing instructions for performing the method 600. The method 600 can alternatively be performed via other suitable systems or devices. For example, a mobile device 12 can be configured to execute an application for performing the method 600. The method 600 includes receiving identifying information of a user corresponding to one or more environmental conditions (step 602) and detecting the user at a particular location (step 604). Mapping data is received defining positioning of the one or more environmental conditions (step 606), and an alert is provided to the user in response to the one or more environmental conditions corresponding to the detected particular location (step 608). The mapping data preferably includes geographic information system (GIS) mapping data. The user is preferably detected at the particular location a predetermined number of times to establish a pattern prior to providing an alert corresponding to the particular location.

In an example pursuant to the method 600, an indication is received from a particular user (e.g. Paul) that he is allergic to pollen. Paul is detected to travel to a particular location corresponding to a particular location, his place of work, retail store 912, a predetermined number of times evidencing a pattern of travel to the particular location. Mapping data (e.g. GIS mapping data) is received indicating that today there is a high concentration of pollen in the air near the retail store 912. Based on Paul's indication and the mapping data, an alert is provided to Paul indicating that his work is near an area with a high concentration of allergen (e.g. pollen). The indication from Paul and the mapping data can be received for example by the coordination system 30, and the coordination system 30 can transmit the alert to Paul through the network 72 via his mobile device 12 indicating that his place of work is near a high concentration of pollen.

While embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A computer-implemented method for providing an alert regarding mobile device location, the method comprising:
   obtaining location data corresponding to locations of a plurality of mobile device users over a period of time;
   obtaining identifying information corresponding to the plurality of mobile device users and a particular mobile device user;
   comparing the identifying information of the plurality of mobile device users with the identifying information of the particular mobile device user;
   determining a location pattern of the plurality of mobile device users based on the location data in response to the identifying information of the plurality of mobile device users corresponding to the identifying information of the particular user;
   detecting a current location of the particular mobile device user; and
   providing an alert based on the current location of the particular mobile device user and the determined location pattern.

2. The method of claim 1, wherein the particular mobile device user corresponds to a first user, and wherein providing the alert comprises rendering the current location accessible to a second user.

3. The method of claim 1, further comprising:
   providing a suggestion that an alert be generated;
   obtaining an acceptance of the suggestion; and
   detecting the current location and alerting the user to the current location in response to obtaining the acceptance of the suggestion.

4. The method of claim 1, further comprising providing the alert to at least one of a local application and a remote application.

5. The method of claim 1, further comprising obtaining via a network the identifying information from a system executing a social networking application configured to retrieve the identifying information.

6. The method of claim 1, wherein determining the location pattern comprises determining the plurality of users are at a particular location during a particular time period of a day for a predetermined number of days.

7. The method of claim 6, further comprising providing the alert in response to the current location of the particular mobile device being at the particular location during the particular time period of the day.

8. The method of claim 6, further comprising providing the alert in response to the current location of the particular mobile device being a predetermined distance from the particular location during the particular time period of the day for a predetermined number of days.

9. The method of claim 1, further comprising:
   suggesting the particular mobile device user receive the alert;
   obtaining an acceptance of the suggestion from the particular mobile device user; and
   detecting the current location and providing the alert in response to obtaining the acceptance of the suggestion.

10. The method of claim 1, further comprising providing the alert to another user.

11. The method of claim 1, further comprising:
    providing a suggestion to another user to provide the alert to the another user;
    obtaining an acceptance of the suggestion from the other user; and
    detecting the current location and providing the alert to the other user in response to obtaining the acceptance of the suggestion.

12. A computer-implemented method for providing an alert regarding mobile device location, the method comprising:
    obtaining location data corresponding to locations of a plurality of mobile device users over a period of time;
    obtaining identifying information corresponding to the plurality of mobile device users and a particular mobile device user;
    comparing the identifying information of the plurality of mobile device users with the identifying information of the particular mobile device user;
    determining a location pattern of the plurality of mobile device users based on the location data in response to the identifying information of the plurality of mobile device users not corresponding to the identifying information of the particular user;
    detecting a current location of the particular mobile device user; and
    providing an alert based on the current location of the particular mobile device user and the determined location pattern.

13. A computer-implemented method for providing an alert regarding mobile device location, the method comprising:
    obtaining location data corresponding to locations of a plurality of mobile device users over time;
    obtaining location data corresponding to locations of a particular mobile device user over time;
    determining a location pattern of the plurality of mobile device users based on the location data;
    obtaining an event schedule specifying types of events corresponding to at least one venue;
    determining event preferences of the plurality of mobile device users and the particular mobile device user by determining types of events attended by the plurality of mobile device users and the types of events attended by the particular mobile device user based on the location data and the event schedule;
    comparing an event preference of the plurality of mobile device users with an event preference of the particular mobile device user;
    detecting a current location of the particular mobile device user; and
    providing an alert based on the current location of the particular mobile device user, the determined location pattern, and the comparison.

14. The method of claim 13, further comprising providing the alert as a recommendation that the particular mobile device user be present at a particular location corresponding to or a predetermined distance from the current location in response to the event preference of the particular mobile device user substantially matching the event preference of the plurality of mobile device users.

15. The method of claim 13, further comprising providing the alert as a recommendation that the particular mobile device user not be present at a particular location corresponding to or a predetermined distance from the current location in response to the event preference of the particular mobile device user substantially not matching the event preference of the plurality of mobile device users.

16. A system for providing an alert regarding mobile device location comprising at least one computing device including at least one memory comprising instructions operable to enable the at least one computing device to perform a procedure comprising:
- obtaining location data corresponding to locations of a plurality of mobile device users over a period of time;
- obtaining identifying information corresponding to the plurality of mobile device users and a particular mobile device user;
- comparing the identifying information of the plurality of mobile device users with the identifying information of the particular mobile device user;
- determining a location pattern of the plurality of mobile device users based on the location data in response to the identifying information of the plurality of mobile device users corresponding to the identifying information of the particular user;
- detecting a current location of the particular mobile device user; and
- providing an alert based on the current location of the particular mobile device user and the determined location pattern.

* * * * *

UNITED STATES PATENT AND TRADEMARK OFFICE
CERTIFICATE OF CORRECTION

Page 1 of 1

PATENT NO. : 8,725,174 B2
APPLICATION NO. : 13/087250
DATED : May 13, 2014
INVENTOR(S) : Joel Grossman et al.

It is certified that error appears in the above-identified patent and that said Letters Patent is hereby corrected as shown below:

Title Page, correct Item (75) Inventors, to read:

-- Joel Grossman, Lafayette, CA (US); Jacqueline Allison Bernstein, San Francisco, CA (US); Mitchell Scott Ozer, San Francisco, CA (US); Daniel Hodges, San Francisco, CA (US); Tasos Roumeliotis, Los Cerros, Orinda, CA (US) --.

Signed and Sealed this
Thirteenth Day of January, 2015

Michelle K. Lee
*Deputy Director of the United States Patent and Trademark Office*